United States Patent
Jeong et al.

(10) Patent No.: US 10,321,290 B2
(45) Date of Patent: Jun. 11, 2019

(54) METHOD FOR PROCESSING REQUEST MESSAGE IN WIRELESS COMMUNICATION SYSTEM AND APPARATUS THEREFOR

(71) Applicant: LG ELECTRONICS INC., Seoul (KR)

(72) Inventors: Seungmyeong Jeong, Seoul (KR); Seungkyu Park, Seoul (KR); Seongyun Kim, Seoul (KR); Hongbeom Ahn, Seoul (KR); Heedong Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 29 days.

(21) Appl. No.: 15/316,774

(22) PCT Filed: May 27, 2015

(86) PCT No.: PCT/KR2015/005295
§ 371 (c)(1),
(2) Date: Dec. 6, 2016

(87) PCT Pub. No.: WO2016/003071
PCT Pub. Date: Jan. 7, 2016

(65) Prior Publication Data
US 2017/0257726 A1    Sep. 7, 2017

Related U.S. Application Data

(60) Provisional application No. 62/019,387, filed on Jun. 30, 2014, provisional application No. 62/052,481, filed on Sep. 19, 2014.

(51) Int. Cl.
*H04W 4/70*    (2018.01)
*H04W 60/04*    (2009.01)
(Continued)

(52) U.S. Cl.
CPC ............... *H04W 4/70* (2018.02); *H04L 67/12* (2013.01); *H04L 67/16* (2013.01);
(Continued)

(58) Field of Classification Search
CPC ....... H04W 4/005; H04W 60/00; H04W 8/20; H04W 48/16
(Continued)

(56) References Cited

U.S. PATENT DOCUMENTS

| 2010/0008327 A1* | 1/2010 | Son | H04W 8/26 370/331 |
| 2012/0220326 A1* | 8/2012 | Li | H04W 8/22 455/509 |

(Continued)

FOREIGN PATENT DOCUMENTS

| WO | WO 2011/043571 A2 | 4/2011 |
| WO | WO 2012/138148 A2 | 10/2012 |

(Continued)

OTHER PUBLICATIONS

Lee et al., "Machine-to-Machine Communication Standardization Trends and End-to-End Service Enhancements Through Vertical Handover Technology," IEEE 55th International Midwest Symposium on Circuits and Systems, Boise, Idaho, USA, Aug. 5-8, 2012, pp. 840-844 (6 pages total).

*Primary Examiner* — Jaime M Holliday
(74) *Attorney, Agent, or Firm* — Birch, Stewart, Kolasch & Birch, LLP

(57) ABSTRACT

A method for processing a request message in a wireless communication system according to one embodiment of the present invention is performed by a first M2M device and comprising the steps of: receiving the request message directly from a transmission device; determining whether the transmission device is registered in the first M2M
(Continued)

device; determining whether the request message is for handover setup if the transmission device is not registered in the first M2M device; storing handover information contained in the request message if the request message is for handover setup; updating registration information related to the transmission device according to the handover information; and transmitting a processing result regarding the request message to the transmission device.

14 Claims, 11 Drawing Sheets

(51) Int. Cl.
*H04W 36/00* (2009.01)
*H04L 29/08* (2006.01)
*H04W 60/00* (2009.01)
*H04W 8/20* (2009.01)

(52) U.S. Cl.
CPC ........ *H04W 36/0011* (2013.01); *H04W 60/04* (2013.01); *H04W 8/20* (2013.01); *H04W 60/00* (2013.01)

(58) Field of Classification Search
USPC .................................................. 455/436–444
See application file for complete search history.

(56) References Cited

U.S. PATENT DOCUMENTS

2013/0212236 A1* 8/2013 Foti .................... H04W 4/70
709/221
2016/0021592 A1* 1/2016 Vesely .............. H04W 36/0072
370/331

FOREIGN PATENT DOCUMENTS

WO   WO 2013/032093 A1   3/2013
WO   WO 2013/035954 A1   3/2013

* cited by examiner

METHOD FOR PROCESSING REQUEST MESSAGE IN WIRELESS COMMUNICATION SYSTEM AND APPARATUS THEREFOR

CROSS REFERENCE TO RELATED APPLICATIONS

This application is the National Phase of PCT International Application No. PCT/KR2015/005295, filed on May 27, 2015, which claims priority under 35 U.S.C. 119(e) to U.S. Provisional Application No. 62/019,387, filed on Jun. 30, 2014 and 62/052,481, filed on Sep. 19, 2014, all of which are hereby expressly incorporated by reference into the present application.

TECHNICAL FIELD

The present invention relates to a method for processing a request message in a wireless communication system and an apparatus therefor.

BACKGROUND ART

In M2M communication environments, each entity acquires basic configuration information through pre-provisioning, registers in an M2M system/service using the information and then uses the M2M service. Here, a registration procedure is performed one-to-one between a registree entity and a registrar entity. The registree sends a request message for using services to other entities through the registrar.

However, when the registree moves and thus does not directly send a request message to the registrar, that is, when the registree needs to transmit the request message through another entity, problems are generated. In this case, the entity does not deliver the request message to a target entity because the request message is not sent from a registree of the entity. To solve this problem, the registree may be registered with the entity. However, when the registree is registered with a new entity, the entity ID of the registree may be changed. Since the registree can access resources in an M2M system only using the previous ID, the registree has a problem in use of services if a new ID is assigned thereto through new registration. Furthermore, when the registree cancels previous registration and registers with a new entity, child resources of service resources previously used by the registree are deleted along with cancellation of previous registration and thus the registree cannot use the child resources.

Accordingly, the present invention proposes a method through which a registree can continuously use services without registering with other entities even when the registree moves.

DISCLOSURE

Technical Problem

An object of the present invention devised to solve the problem lies in a method for processing a request message and an apparatus therefor. More specifically, the present invention proposes a method for processing a request message according to handover of a specific entity corresponding to a target or an originator of the request message and an apparatus therefor.

The technical problems solved by the present invention are not limited to the above technical problems and those skilled in the art may understand other technical problems from the following description.

Technical Solution

In an aspect of the present invention, a method for processing a request message in a wireless communication system, the method being performed by a first M2M device, includes: receiving the request message from an originator device; determining whether the originator device has been registered to the first M2M device; determining whether the request message is for handover setup if the originator device has not been registered to the first M2M device; storing handover information included in the request message if the request message is for handover setup; updating registration information related to the originator device according to the handover information; and transmitting a processing result regarding the request message to the originator device.

Additionally or alternatively, the handover information may include the ID of the originator device, a registration information ID and a handover ID.

Additionally or alternatively, the updating the registration information related to the originator device may include storing handover state information including the ID of the first M2M device, a handover ID and a handover information ID in the registration information.

Additionally or alternatively, update of the registration information may be announced to a server and used for message routing or forwarding.

Additionally or alternatively, the method may further include assigning a handover ID related to handover setup to the originator device.

Additionally or alternatively, the method may further include: determining whether the first M2M device has handover information related to the originator device if the request message is not for handover setup; updating registration information related to the originator device when the first M2M device has the handover information related to the originator device; and processing the request message.

Additionally or alternatively, the determining whether the first M2M device has handover information related to the originator device may include comparing information about the originator device with the handover information stored in the first M2M device.

Additionally or alternatively, the method may further include: if the originator device has been registered in the first M2M device, determining whether handover state information related to the originator device is stored in the registration information related to the originator device; deleting the handover state information when the handover state information is stored in the registration information related to the originator device; and processing the request message.

Additionally or alternatively, the handover information may be stored as a specific value in a resource created under a specific resource of the first M2M device.

In another aspect of the present invention, an M2M device configured to process a request message in a wireless communication system includes: a radio frequency (RF) unit; and a processor configured to control the RF unit, wherein the processor is configured to: receive the request message directly from an originator device, to determine whether the originator device has been registered to the first M2M device, determine whether the request message is for handover setup if the originator device has not been registered to the first M2M device, store handover information included in the request message if the request message is for handover setup, update registration information related to the originator device according to the handover information and transmit a processing result regarding the request message to the originator device.

Additionally or alternatively, the handover information may include the ID of the originator device, a registration information ID and a handover ID.

Additionally or alternatively, the processor may be configured to store handover state information including the ID of the first M2M device, a handover ID and a handover information ID in the registration information to update the registration information related to the originator device.

Additionally or alternatively, update of the registration information may be announced to a server and used for message routing or forwarding.

Additionally or alternatively, the processor may be configured to assign a handover ID related to handover setup to the originator device.

Additionally or alternatively, the processor may be configured to: determine whether the first M2M device has handover information related to the originator device if the request message is not for handover setup, update registration information related to the originator device when the first M2M device has the handover information related to the originator device and process the request message.

Additionally or alternatively, the processor may be configured to compare information about the originator device with the handover information stored in the first M2M device to determine whether the first M2M device has handover information related to the originator device.

Additionally or alternatively, if the originator device has been registered in the first M2M device, the processor may be configured to determine whether handover state information related to the originator device is stored in the registration information related to the originator device, to delete the handover state information when the handover state information is stored in the registration information related to the originator device and to process the request message.

Additionally or alternatively, the handover information may be stored as a specific value in a resource created under a specific resource of the first M2M device.

The aforementioned technical solutions are merely parts of embodiments of the present invention and various embodiments in which the technical features of the present invention are reflected can be derived and understood by a person skilled in the art on the basis of the following detailed description of the present invention.

Advantageous Effects

According to an embodiment of the present invention, it is possible to improve wireless communication request message processing efficiency.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE

Reference will now be made in detail to the preferred embodiments of the present invention, examples of which are illustrated in the accompanying drawings. The following detailed description of the invention includes details to aid in full understanding of the present invention. Those skilled in the art will appreciate that the present invention can be implemented without these details.

In some cases, to prevent the concept of the present invention from being obscured, structures and apparatuses of the known art will be omitted, or will be shown in the form of a block diagram based on main functions of each structure and apparatus. In addition, wherever possible, the same reference numbers will be used throughout the drawings and the specification to refer to the same or like parts.

In the present disclosure, devices for device-to-device communication, that is, M2M devices, may be fixed or mobile and include devices which communicate with a server for device-to-device communication, that is, an M2M server to transmit/receive user data and/or various types of control information. The M2M devices may be referred to as terminal equipment, mobile stations (MSs), mobile terminals (MTs), user terminals (UTs), subscriber stations (SSs), wireless devices, personal digital assistants (PDA), wireless modems, handheld devices and the like. In the present invention, the M2M server refers to a fixed station which communicates with M2M devices and/or other M2M servers, and exchanges various types of data and control information with M2M devices and/or other M2M servers by communicating with the M2M devices and/or other M2M servers.

A description will be given of technology associated with the present invention.

M2M Applications

These are applications that execute service logic and use a common service entity (CSE) accessible through an open interface. The M2M applications can be installed in an M2M device, an M2M gateway or an M2M server.

M2M Service

This is a set of functions that can be used by the M2M CSE through standardized interfaces.

oneM2M defines a common M2M service framework (or service platform, CSE or the like) for various M2M applications (or application entities (AEs)). M2M applications can be considered as software implementing service logic such as e-Health, City Automation, Connected Consumer and Automotive. The oneM2M service framework includes functions commonly necessary to implement various M2M applications. Accordingly, it is possible to easily implement various M2M applications using the oneM2M service framework without configuring frameworks necessary for the respective M2M applications. This can integrate M2M markets currently divided into many M2M verticals, such as smart building, smart grid, e-Heath, transportation and security, and thus remarkable growth of the M2M markets is expected.

Figure 1:
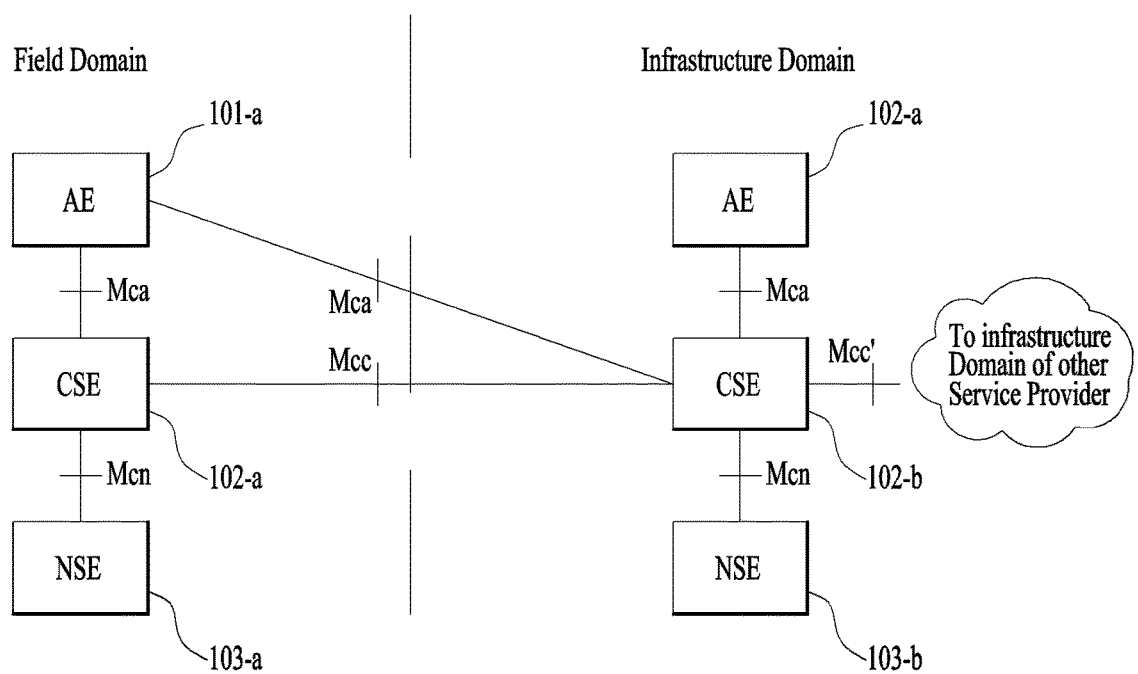
FIG. 1 illustrates a functional architecture of an M2M communication system.

FIG. 1 illustrates the architecture of an M2M communication system. Each entity will now be described.

Application entity (AE, 101): Application entity provides application logic for end-to-end M2M solutions. Examples of the application entity include fleet tracking application, remote blood sugar monitoring application, remote power metering and controlling application.

Common service entity (CSE, 102): CSE comprises the set of "service functions" that are common to M2M environments and specified by oneM2M. Such service functions are exposed to AEs and other CSEs through reference points X and Y and used by the AEs and other CSEs. The reference point Z is used for accessing underlying network service entities.

Examples of the service functions provided by the CSE include data management, device management, M2M subscription management and location service. These functions can be logically classified into common service functions (CSFs). Some CSFs in the CSE are mandatory and some may be optional. Further, some functions in the CSFs are mandatory and some functions may be optional (e.g. some of application software installation, firmware update, logging and monitoring functions in "device management" CSF are mandatory functions and some are optional functions.)

Underlying network service entity (NSE, 103): provides services to the CSEs. Examples of such services include device management, location services and device triggering. No particular organization of the NSEs is assumed. Note: underlying networks provide data transport services between entities in the oneM2M system. Such data transport services are not included in the NSE.

The reference points shown in FIG. 1 will now be described.

Mca Reference Point

This is the reference point between an AE and a CSE. The Mca reference point allows the CSE to communicate with the AE such that the AE can use the services provided by the CSE.

The services provided through the Mca reference point are dependent on the functionality supported by the CSE. The AE and the CSE may or may not be co-located within the same physical entity.

Mcc Reference Point

This is the reference point between two CSEs. The Mcc reference point allows a CSE to use the services of another CSE in order to fulfill needed functionality. Accordingly, the Mcc reference point between two CSEs is supported over different M2M physical entities. The services offered via the Mcc reference point are dependent on the functionality supported by the CSEs.

Mcn Reference Point

This is the reference point between a CSE and an NSE. The Mcn reference point allows a CSE to use the services (other than transport and connectivity services) provided by the NSE in order to fulfill the needed functionality. It means services other than simple service such as transport and connectivity, for example, services such as device triggering, small data transmission and positioning.

Mcc' Reference Point

This is the reference point is used for communication between CSEs respectively belongs to different M2M service providers. Mcc' references point is similar to Mcc reference point in respect of connecting CSEs each other, but Mcc' reference point expands Mcc reference point to different M2M service providers while Mcc reference point is limited to communication in a single M2M service provider.

Figure 2:
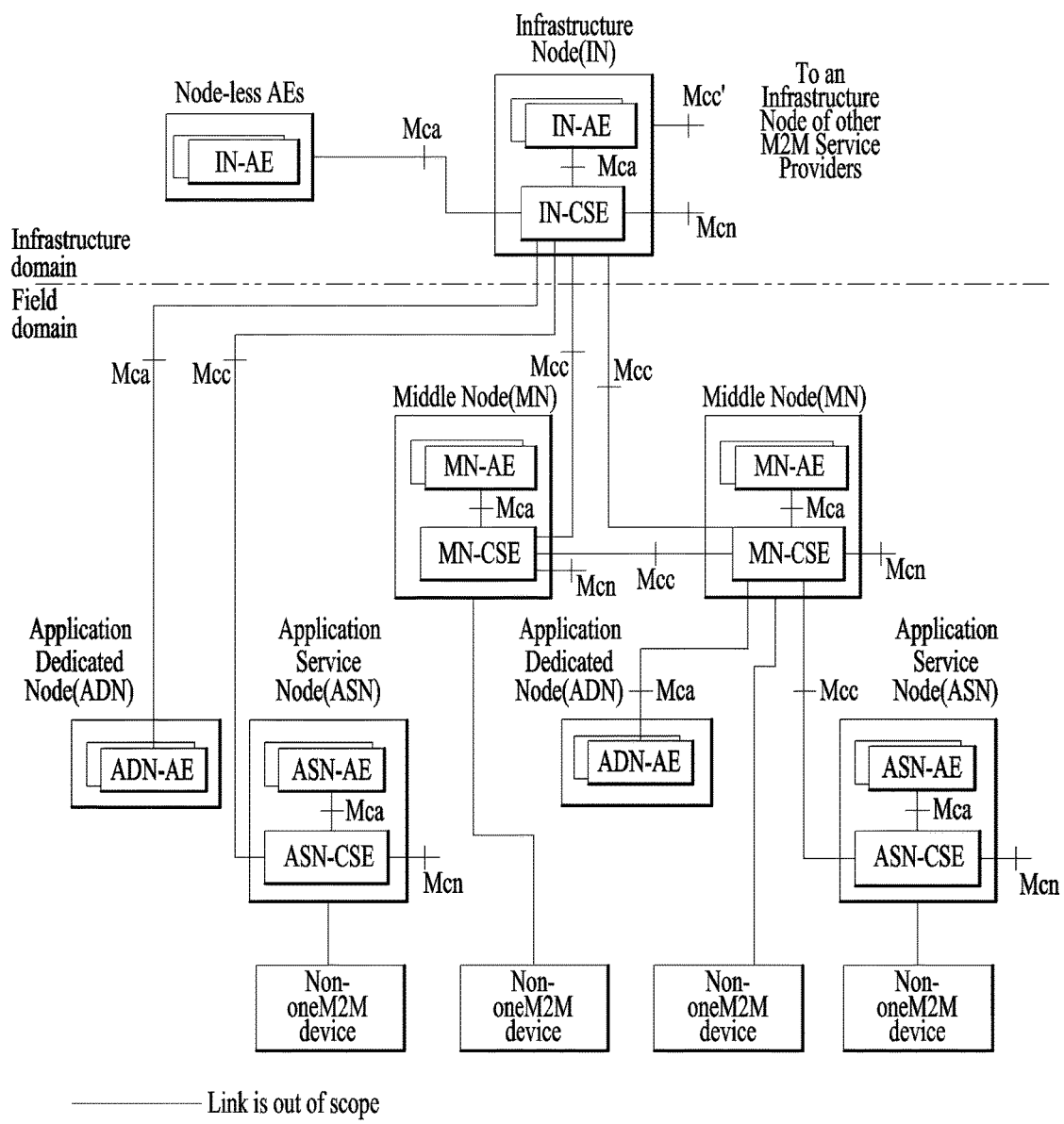
FIG. 2 illustrates an architecture supported by the M2M communication system on the basis of the M2M functional architecture.

FIG. 2 illustrates compositions supported by M2M communication system based on the architecture. The M2M communication system may support more various compositions without being limited to the illustrated compositions. A concept, which is called to node, important for understand the illustrated compositions will be explained.

Application Dedicated Node (ADN): An application dedicated node is a node that contains at least one M2M application and does not contain a CSE. The ADN can communicate over an Mca reference point with one middle node or one infrastructure node. The ADN can be present in an M2M device.

Application Service Node (ASN): An application service node is a node that contains at least one CSE and has at least one M2M application. The ASN can communicate over a Mcc reference point with one middle node or one infrastructure node. The ASN can be present in an M2M device.

Middle Node (MN): A middle node is a node that contains at least one CSE and may contain M2M applications. The middle node communicates over a Mcc references point with at least two nodes belonging to the following different category:

one or more ASNs;
one or more middle nodes (MNs); and
one infrastructure structure.

The MN can be connected with the ADN through an Mca reference point. The MN can be present in an M2M gateway.

Infrastructure Node (IN): An infrastructure node is a node that contains one CSE and may contain application entities (AEs). The IN can be present in M2M server.

The IN communicates over a Mcc reference point with either:

one or more middle nodes; and/or
one or more application service nodes.

The IN may communicate with one or more ADNs over one or more Mca reference points.

Figure 3:
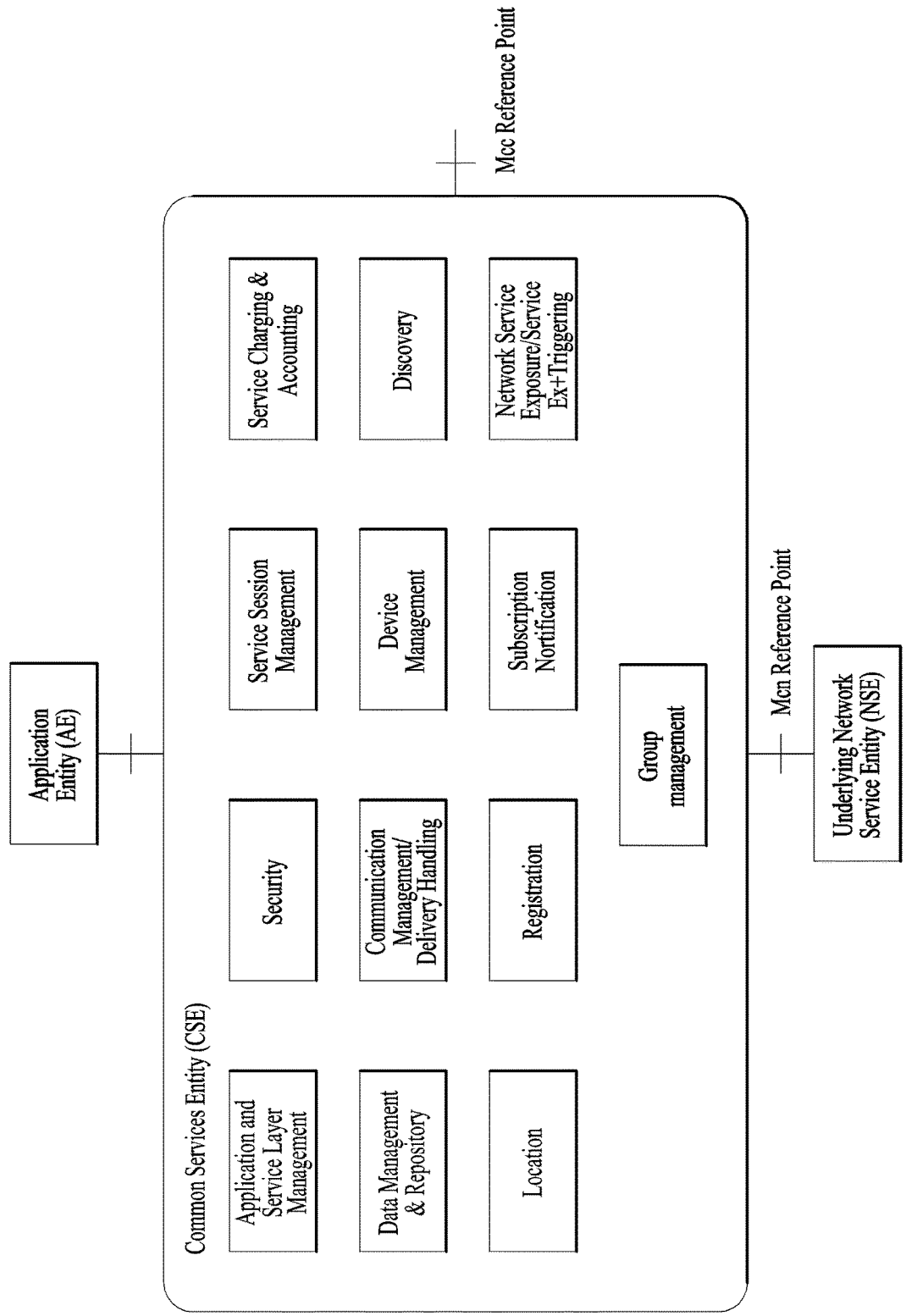
FIG. 3 illustrates a common service function provided by the M2M communication system.

FIG. 3 illustrates M2M service functions in the M2M communication system.

M2M service functions (i.e. common service functions) provided by the oneM2M service framework include "Communication Management and Delivery Handling", "Data Management and Repository", "Device Management", "Discovery", "Group Management", "Addressing and Identification", "Location", "Network Service Exposure, Service Execution and Triggering", "Registration", "Security", "Service Charging and Accounting", "Session Management" and "Subscription and Notification.", as shown in FIG. 3.

A brief description will be given of each M2M service function.

Communication Management and Delivery Handling (CMDH): this provides communications with other CSEs, AEs and NSEs and delivers messages.

Data Management and Repository (DMR): this enables M2M applications to exchange and share data.

Device Management (DMG): this manages M2M devices/gateways. Specifically, the device management function includes installation and setting of applications, determination of set values, firmware update, logging, monitoring, diagnostics, topology management, etc.

Discovery (DIS): this discovers resources and information based on conditions.

Group Management (GMG): this processes a request related to a group that may be generated by grouping resources, M2M devices or gateways.

Addressing and Identification (AID): this identifies and addresses physical or logical resources.

Location (LOC): this enables M2M applications to obtain position information of an M2M device or gateway.

Network Service Exposure, Service Execution and Triggering (NSE): this enables communication of an underlying network and use of functions provided by the underlying network.

Registration (REG): this handles registration of an M2M application or another CSE with a specific CSE. Registration is performed in order to use M2M service functions of the specific CSE.

Security (SEC): this performs handling of sensitive data such as a security key, association establishment, authentication, authorization, identity protection, etc.

Service Charging and Accounting (SCA): this provides a charging function to CSEs.

Session Management (SM): this manages an M2M session for end-to-end communication.

Subscription and Notification (SUB): this notifies change of a specific resource when the change of the specific resource is subscribed.

The M2M service functions are provided through CSE, and AE (or, M2M applications) may use through Mca reference point, or other CSE may use the M2M service functions through Mcc reference point. Also, the M2M service functions may be operated synchronized with underlying network (or underlying network service entity (NSE) such as 3GPP, 3GPP2, Wi-Fi, Bluetooth).

All oneM2M devices/gateways/infrastructures do not have higher functions and may have mandatory functions and some optional functions from among the corresponding functions.

The term "resource" in the M2M communication system may be used to construct and express information in the M2M communication system, and may indicate all kinds of things capable of being identified by URI. The resource may be classified into a general resource, a virtual resource, and an announced resource. Respective resources can be defined as follows.

Virtual Resource: The virtual resource may trigger specific processing, and/or may perform retrieving of the result. The virtual resource is not permanently contained in CSE.

Announced Resource: The announced resource is a resource contained in the resource CSE connected to the announced (or notified) original resource. The announced resource may maintain some parts of the characteristics of the original resource. The resource announcement may facilitate the resource searching or discovery. The announced resource contained in the remote CSE is not present as a child of the original resource in the remote CSE, or may be used to generate child resources instead of the announced child of the original resource.

General resource: If this resource is not designated as the virtual or announced resource, the corresponding resource is a general resource.

Figure 4:
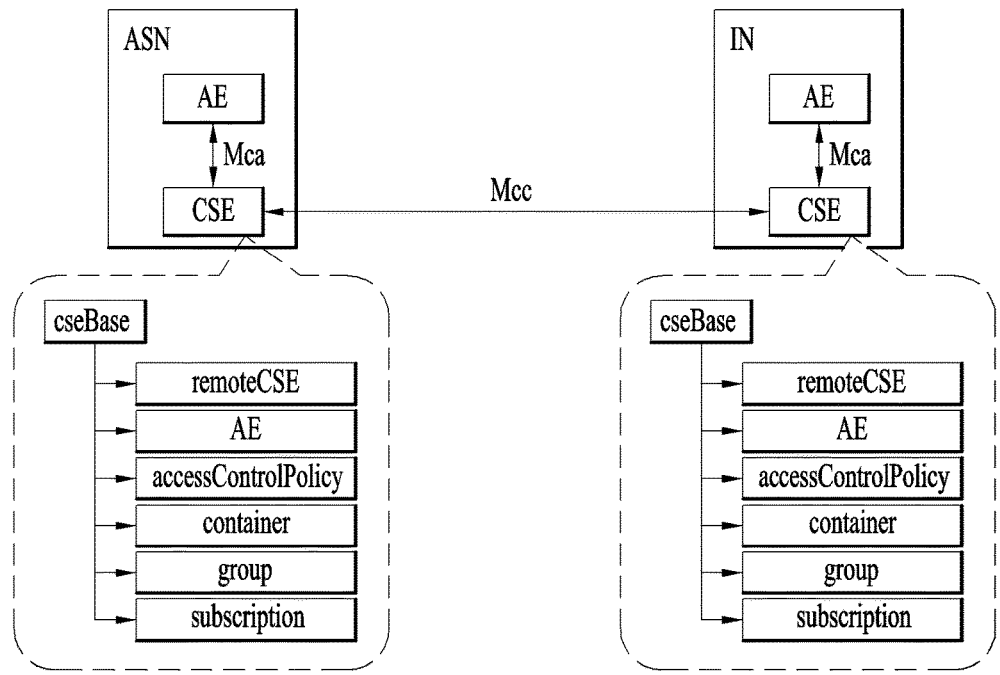
FIG. 4 illustrates resource structures present in an M2M application service node and an M2M infrastructure node.

FIG. 4 illustrates structures of resources present in an M2M application service node and an M2M infrastructure node.

The M2M architecture defines various resources. M2M services for registering applications and reading sensor values can be performed by operating the resources. The resources are configured in one tree structure and may be logically connected to the CSE or stored in the CSE to be stored in M2M devices, M2M gateways, network domains and the like. Accordingly, the CSE can be referred to as an entity that manages resources. The resources have a <cseBase> as a tree root. Representative resources are described below.

<cseBase> resource: this is a root resource of oneM2M resources configured in a tree and includes all other resources.

<remoteCSE> resource: this belongs to <cseBase> resource and includes information on other CSE being connected or registered to corresponding CSE.

<AE> resource: this is a resource that is lower than <cseBase> or <remoteCSE> resource, and stores information on applications registered (connected) with the corresponding CSE when present under <cseBase> resource, and stores information on applications registered with other CSEs (in the name of CSE) when present under <remoteCSE> resource.

<accessControlPolicy> resource: this stores information associated with access rights to specific resources. Authentication is performed using access rights information included in this resource.

<container> resource: this is a resource that is lower than containers and stores data per CSE or AE.

<group> resource: this is a resource that is lower than groups and provides a function of grouping a plurality of resources and simultaneously processing the grouped resources.

<subscription> resource: this is a resource that is lower than subscriptions and executes a function of announcing a state change such as a resource value change through notification.

Figure 5:
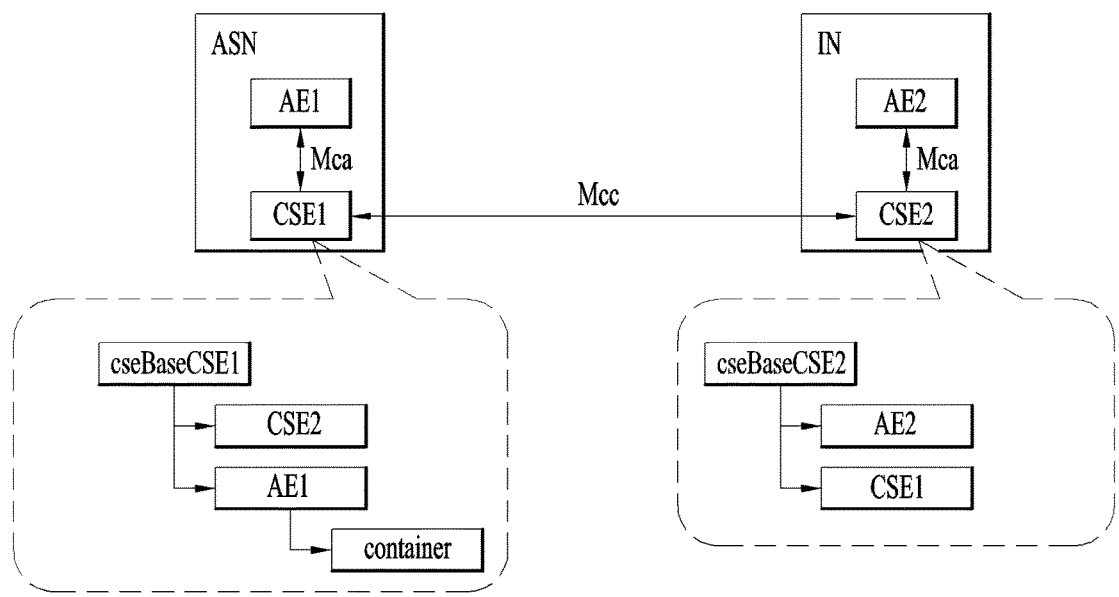
FIG. 5 illustrates resource structures present in an M2M application service node (e.g., M2M device) and an M2M infrastructure node.

FIG. 5 illustrates structures of resources present in an M2M application service node (e.g. M2M device) and an M2M infrastructure node.

A description will be given of a method by which an AE (application 2) registered with the M2M infrastructure node reads a value of a sensor of the M2M device. The sensor refers to a physical device, in general. An AE (application 1) present in the M2M device reads a value from the sensor and stores the read value in the form of a container resource in a CSE (CSE 1) in which the AE (application 1) has registered. To this end, the AE present in the M2M device needs to be pre-registered with the CSE present in the M2M device. Upon completion of registration, registered M2M application related information is stored in the form of cseBaseCSE1/application1 resource, as shown in FIG. 5.

When the sensor value is stored, by the AE present in the M2M device, in a container resource lower than the cseBaseCSE1/application1 resource, the AE registered with the infrastructure node can access the corresponding value. To enable access, the AE registered with the infrastructure node also needs to be registered with a CSE (CSE 2) of the infrastructure node. Registration of the AE is performed by storing information about application 2 in cseBaseCSE2/application2 resource as application 1 is registered with CSE 1. Application 1 communicates with application 2 via CSE 1 and CSE 2 instead of directly communicating with application 2. To this end, CSE 1 needs to be pre-registered with CSE 2. When CSE 1 registers with CSE 2, CSE 1 related information (e.g. Link) is stored in the form of <remoteCSE> resource lower than cseBaseCSE2 resource. That is, <remoteCSE> provides a CSE type, access address (IP address and the like), CSE ID, and reachability information about the registered CSE.

Resource discovery refers to a process of discovering resources present in a remote CSE. Resource discovery is performed through a retrieve request and the retrieve request for resource discovery includes the following.

<startURI>: this indicates a URI. The URI can be used to limit the range of resources to be discovered. If <startURI> indicates a resource root <cseBase>, resource discovery is performed on all resources of a receiver that has received the retrieve request. The receiver performs resource discovery only on a resource indicated by <startURI> and a lower resource thereof.

filterCriteria: this information describes information related to a resource to be discovered. The receiver searches the resources within a discovery range defined by <startURI> for a resource that satisfies filterCriteria and transmits the resource to a requester of the corresponding request.

As shown in FIG. 4 or 5, the resource for use in the M2M system may be represented by a tree structure, and the root resource type may be denoted by <CSEBase>. Therefore, the <CSEBase> resource type must be present only when the common service entity (CSE) is present.

Figure 6:
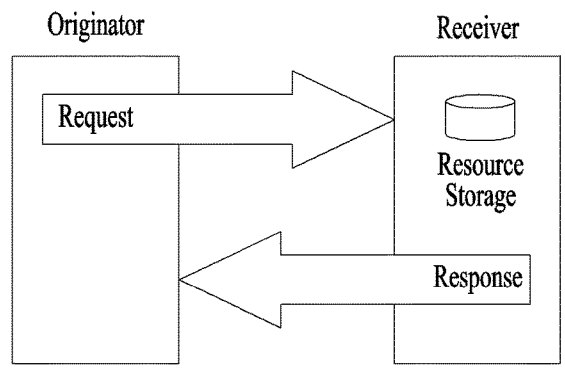
FIG. 6 illustrates a procedure for exchanging a request message and a response message used in an M2M communication system.

FIG. 6 is a conceptual diagram illustrating a general communication flow located at Mca and Mcc reference points. The M2M system operation is carried out on the basis of data exchanging. For example, in order to allow a first device to transmit or perform a command for stopping a specific operation of a second device, the first device must transmit the corresponding command (configured in a data form) to the second device. In the M2M system, data can be exchanged using the request and response messages during communication between the application (or CSE) and another CSE.

The request message may include the following information.
- Operation: "Operation" means the shape of an operation to be carried out. (This information may be selected from among Create, Retrieve, Update, Delete, and Notify.)
- To: "To" means an ID (i.e., ID of the receiver) of an entity scheduled to receive the request.
- From: "From" means an ID of a calling user (i.e., call originator) who generates the request.
- Request Identifier: "Request Identifier" means an ID (i.e., ID used to discriminate the request message) of the request message
- Content: "Content" means content of resources to be transmitted.

The response message may include the following information. If the corresponding request message is successfully processed, the response message may include the following information.
- To: "To" means an ID of a calling user (i.e., a call originator) who generates the request message.
- From: "From" means an ID of a called person (i.e., a call receiver) who receives the request message.
- Request Identifier: "Request Identifier" means an ID of the request message used to identify the ID of the request message.
- Result contents: "Result contents" means the processed result (for example, Okay, Okay and Done, Okay and in progress) of the request message.
- Content: "Content" means content of resources to be transmitted (only the resultant value (rs) can be transmitted.)

If the request message processing is failed, the response message may include the following information.
- To: "To" means an ID of a calling user (i.e., a call originator) who generates the request message.
- From: "From" means an ID of a called person (i.e., a call receiver) who receives the request message.
- Request Identifier: "Request Identifier" means an ID of the request message (so as to identify the ID of the request message).
- rs: "rs" means the processed result (for example, Not Okay) of the request message.

As described above, the response message may include the above-mentioned information.

Meanwhile, various resource types shown in the following table are present.

TABLE 1

| Resource Type | Short Description | Child Resource Types | Parent Resource Types |
|---|---|---|---|
| AE | Stores information about the AE. It is created as a result of successful registration of an AE with the registrar CSE. | subscription, container, group, accessControlPolicy, mgmtObj, commCapabilities, pollingChannel | remoteCSE, CSEBase |
| cmdhNwAccessRule | Defines a rule for the usage of underlying networks. | schedule subscription | cmdhNetworkAccessRules |
| CSEBase | The structural root for all the resources that are residing on a CSE. It shall store information about the CSE itself. | remoteCSE, node, application, container, group, | None |

TABLE 1-continued

| Resource Type | Short Description | Child Resource Types | Parent Resource Types |
|---|---|---|---|
| group | Stores information about resources of the same type that need to be addressed as a Group. Operations addressed to a Group resource shall be executed in a bulk mode for all members belonging to the Group. | accessControlPolicy, subscription, mgmtObj, mgmtCmd, locationPolicy, statsConfig fanOutPoint subscription | Application, remoteCSE, CSEBase |
| locationPolicy | Includes information to obtain and manage geographical location. It is only referred from container, the contentInstances of the container provides location information. | subscription | CSEBase |
| remoteCSE | Represents a remote CSE for which there has been a registration procedure with the registrar CSE identified by the CSEBase resource. | application, container, group, accessControlPolicy, subscription, mgmtObj, pollingChannel, node | CSEBase |
| subscription | Subscription resource represents the subscription information related to a resource. Such a resource shall be a child resource for the subscribe-to resource. | schedule | accessControlPolicy, application, cmdhBuffer, cmdhDefaults, cmdhEcDefParamValues, cmdhDefEcValue, cmdhLimits, cmdhNetworkAccessRules, cmdhNwAccessRule, cmdhPolicy, container, CSEBase, delivery, eventConfig, execInstance, group, contentInstance, locationPolicy, mgmtCmd, mgmtObj, m2mServiceSubscription, node, nodeInfo, parameters, remoteCSE, request, schedule, statsCollect, statsConfig |
| container | Shares data instances among entities. Used as a mediator that takes care of buffering the data to exchange "data" between AEs and/or CSEs. | container, contentInstance, subscription | application, container, remoteCSE, CSEBase |
| contentInstance | Represents a data instance in the container resource. | subscription | container |

Each resource type may be located below the parent resource type of the corresponding resource type, and may have a child resource type. In addition, each resource type may have attributes, and actual values may be stored in the attributes.

Table 2 shows attributes of the <container> resource type. The attributes used to store the actual values may always be set to the value of 1 through multiplicity or may be selectively set to the values ('0 . . . 1') through multiplicity. In addition, the corresponding attributes may be established according to RO (Read Only), RW (Read and Write), WO (Write Only) according to characteristics generated when the corresponding attributes are generated.

TABLE 2

| Attributes of <container> | Multiplicity | RW/RO/WO | Description |
|---|---|---|---|
| resourceType | 1 | RO | Resource Type. This Write Once (at creation time then cannot be changed) resourceType attribute identifies the type of resources. Each resource shall have a resourceType attribute. |

TABLE 2-continued

| Attributes of <container> | Multiplicity | RW/RO/WO | Description |
|---|---|---|---|
| resourceID | 1 | RO | This attribute is an identifier for resource that is used for 'non-hierarchical URI method' or 'IDs based method' cases. This attribute shall be provided by the Hosting CSE when it accepts a resource creation procedure. The Hosting CSE shall assign a resourceID which is unique in the CSE. |
| parentID | 1 | RO | The system shall assign the value to this attribute according to the parameters given in the CREATE Request. It establishes the parent-child relationship by identification of the parent of this child resource. Such identifier shall use the non-hierarchical URI representation. For example, an AE resource with the identifier "myAE1" which has been created under the resource ". . .//example.com/oneM2M/myCSE", the value of the parentID attribute will contain ". . .//parentID". |
| expirationTime | 1 | RW | Time/date after which the resource will be deleted by the hosting CSE. This attribute can be provided by the Originator, and in such a case it will be regarded as a hint to the hosting CSE on the lifetime of the resource. The hosting CSE can however decide on the real expirationTime. If the hosting CSE decides to change the expirationTime attribute value, this is communicated back to the Originator. The lifetime of the resource can be extended by providing a new value for this attribute in an UPDATE operation. Or by deleting the attribute value, e.g. by not providing the attribute when doing a full UPDATE, in which case the hosting CSE can decide on a new value. This attribute shall be mandatory. If the Originator does not provide a value in the CREATE operation the system shall assign an appropriate value depending on its local policies and/or M2M service subscription agreements. |
| accessControlPolicyIDs | 0 . . . 1 (L) | RW | The attribute contains a list of identifiers (either an ID or a URI depending if it is a local resource or not) of an <accessControlPolicy> resource. The privileges defined in the <accessControlPolicy> resource that are referenced determine who is allowed to access the resource containing this attribute for a specific |

TABLE 2-continued

| Attributes of <container> | Multiplicity | RW/RO/WO | Description |
|---|---|---|---|
| | | | purpose (e.g. Retrieve, Update, Delete, etc.). |
| labels | 0 . . . 1 | WR | Tokens used as keys for discovering resources. This attribute is optional and if not present it means that the resource cannot be found by means of discovery procedure which uses labels as key parameter of the discovery. |
| creationTime | 1 | RO | Time/date of creation of the resource. This attribute is mandatory for all resources and the value is assigned by the system at the time when the resource is locally created. Such an attribute cannot be changed. |
| creator | 0 . . . 1 | RO | The AE-ID or CSE-ID of the entity which created the resource. |
| lastModifiedTime | 1 | RO | Last modification time/date of the resource. This attribute shall be mandatory and its value is assigned automatically by the system each time that the addressed target resource is modified by means of the UPDATE operation. |
| stateTag | 1 | RO | An incremental counter of modification on the resource. When a resource is created, this counter is set to 0, and it will be incremented on every modification of the resource. The stateTag attribute of the parent resource should be incremented first and copied into this stateTag attribute when a new instance is added to the parent resource. |
| announceTo | 0 . . . 1 | RW | This attribute may be included in a CREATE or UPDATE Request in which case it contains a list of URIs/CSE-IDs which the resource being created/updated shall be announced to. This attribute shall only be present on the original resource if it has been successfully announced to other CSEs. This attribute maintains the list of URIs to the successfully announced resources. Updates on this attribute will trigger new resource announcement or de-announcement. |
| announcedAttribute | 0 . . . 1 | RW | This attributes shall only be present on the original resource if some Optional Announced (OA) type attributes have been announced to other CSEs. This attribute maintains the list of the announced Optional Attributes (OA type attributes) in the original resource. Updates to this attribute will trigger new attribute announcement if a new attribute is added or de-announcement if the existing attribute is removed.) |

TABLE 2-continued

| Attributes of <container> | Multiplicity | RW/RO/WO | Description |
| --- | --- | --- | --- |
| maxNrOfInstances | 0 . . . 1 | RW | Maximum number of instances of <contentInstance> child resources. |
| maxByteSize | 0 . . . 1 | RW | Maximum number of bytes that are allocated for a <container> resource for all instances in the <container> resource. |
| maxInstanceAge | 0 . . . 1 | RW | Maximum age of the instances of <contentInstance> resources within the <container>. The value is expressed in seconds. |
| currentNrOfInstances | 1 | RO | Current number of instances in a <container> resource. It is limited by the maxNrOfInstances. |
| currentByteSize | 1 | RO | Current size in bytes of data stored in a <container> resource. It is limited by the maxNrOfBytes. |
| latest | 0 . . . 1 | RO | Reference to latest <contentInstance> resource, when present. |
| locationID | 0 . . . 1 | RW | URI of the resource where the attributes/policies that define how location information are obtained and managed. This attribute is defined only when the <container> resource is used for containing location information. |
| ontologyRef | 0 . . . 1 | RW | A URI of the ontology used to represent the information that is managed and understood by the AE. The ontology refers to a specification in which terms and relationship therebetween used in a domain to be handled. |

Entity Registration

An M2M entity finishes preparation for using systems/services by registering with neighboring entities irrespective of whether the M2M entity is located in the field domain or infrastructure domain. Such registration is performed at the request of a registree and information on the registree is stored in a registrar as a registration result.

After registration, oneM2M entities can use M2M services using common functions provided by a CSE, as illustrated in FIG. 3.

oneM2M entities include an AE and a CSE and thus registration may be divided into AE registration and CSE registration. Here, both the AE and CSE refer to registrees and the CSE corresponds to a registrar. In the case of CSE registration, information on the registrar CSE is additionally stored in the registree CSE.

Figure 7:
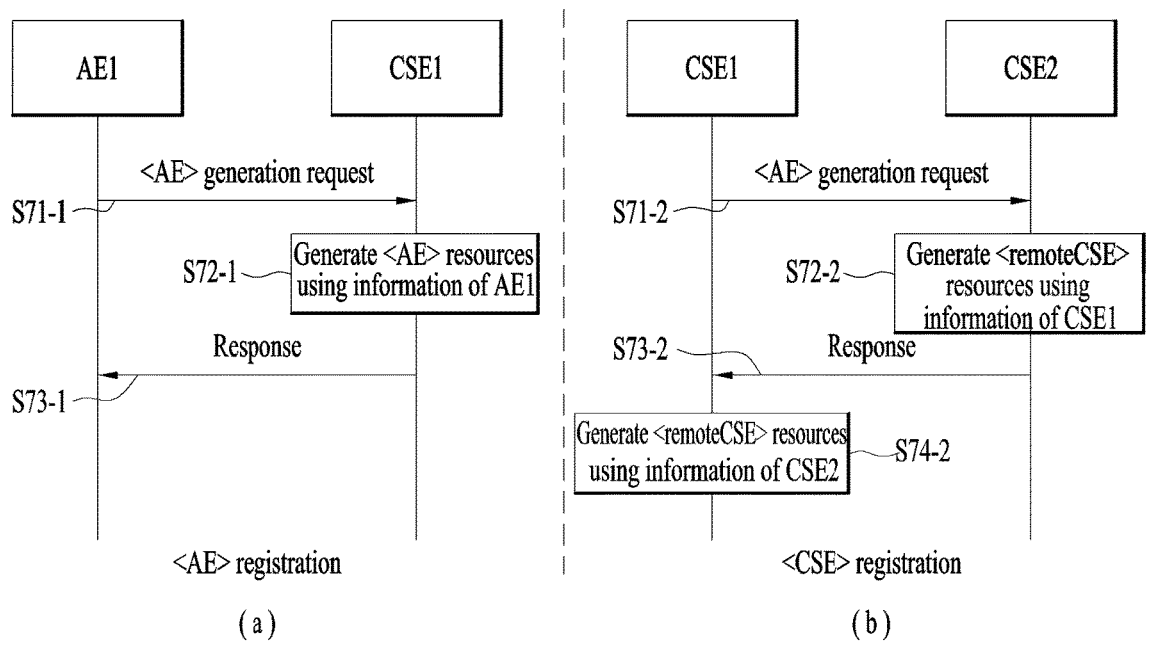
FIG. 7 illustrates a registration procedure in an M2M communication system.

FIG. 7 illustrates an AE registration procedure and a CSE registration procedure. FIG. 7(a) shows the AE registration procedure. AE1 that intends to perform registration sends a request for generation of <AE> resources to CSE1 corresponding to a registrar (S71-1). CSE1 can generate the <AE> resources using information of AE1 (S72-2). Then, CSE1 can send a response including a result of registration to AE1 (S73-2).

FIG. 7(b) illustrates the CSE registration procedure. The procedure of FIG. 7(b) corresponds to the procedure of FIG. 7(a) except that CSE1 corresponds to a registree, CSE2 corresponds to a registrar, and when CSE2 sends a result for a registration request of CSE1 (S73-2), CSE1 generates <remoteCSE> resources using information of CSE2 (S74-2).

Optimization for Constrained Devices

IDs of AE/CSE may be provided prior to registration or determined during registration. Consequently, the AE/CSE can use M2M services using their IDs after completion of registration. Such services are provided while the entities exchange requests/responses, as described with reference to FIG. 6, and a request essentially includes ID information of a request originator.

An entity ID defined in oneM2M has the following format.

CSE-ID: service provider ID+CSE-ID

AE-ID: service provider ID+(Registrar-)CSE-ID+Instance-(of-application-)ID

Here, the service provider ID is necessary to secure uniqueness of the entity ID on Mcc' reference point. In addition, CSE-ID is necessary for securing uniqueness on Mcc reference point. Instance-ID secures uniqueness on Mca reference point only with the corresponding ID.

When the AE sends a request (message) to the outside, the AE preferentially transmits the request to a registrar CSE and the registrar CSE forwards the message to a target. Since AE1 can be uniquely identified using Instance-ID in an Mca period in which the AE initially sends the request to the registrar CSE, AE1 can omit the service provider ID and registrar-CSE-ID when using the ID thereof. Such AE-ID optimization is useful as a method for reducing the size of an exchanged message, one of optimizations for constrained devices.

During system registration, information on a registree, stored in a registrar, can be used by other entities as well as the registrar to identify the registree and a service. That is, the registrar operates as an anchor point of the registree in the system. Accordingly, multiple registration is not permitted when distributed registration is supported as in oneM2M.

The registrar forwards only requests of registrees thereof to the outside. Here, the registrar serves as an end point of the system to restrict entities such that only entities registered in the system can use services. This means that a registree cannot transmit a request to the outside when the registree physically moves and thus cannot directly communicate with the registrar. Furthermore, when the registree moves and thus cannot directly communicate with the registrar, a request from an external entity cannot also be delivered by the registrar to the registree.

To solve this problem, a method of cancelling previous registration and performing re-registration when a registree moves and a method of permitting multiple registration in a system are provided. In the former case, the ID of the registree changes whenever registration is performed, causing problems in ID based access control and a routing problem for the corresponding entity may be generated. In the latter case, identification of currently used registration information during multiple registration becomes a problem.

Even when a registree moves and thus cannot directly communicate with a registrar, the registree needs to be able to use services while exchanging requests/responses with the same anchor point as the registrar. However, a new anchor point cannot be aware of previous registration information and thus may not provide previous services.

Accordingly, the present invention introduces an entity handover concept. Entity handover refers to a procedure through which a registered entity (i.e., registree) sends a handover request to a neighboring entity having handover execution capability and sets the neighboring entity as an entity in charge of handover when the neighboring entity accepts the request, when the registree cannot directly communicate with a registrar. Upon completion of handover, the registree can continue M2M communication through the entity in charge of handover. As a result of execution of the handover procedure, information on the handover entity (i.e., registree) can be stored in the entity in charge of handover. A handover entity and an entity in charge of handover refer to physical M2M devices and, more specifically, logical M2M entities as in an entity registration procedure. After completion of entity handover, the entity in charge of handover can identify a specific handover entity through target information or originator information of a request message upon reception of the request message from the specific entity and thus perform processing of the request message such as delivering the request message to a target. This is similar to the entity registration procedure. Differently from the entity registration procedure, however, a single handover entity can simultaneously have a plurality of entities in charge of handover. That is, even a frequently moving registree can continue M2M communication through a plurality of handover entities without a registrar.

The present invention proposes improved operations, functions or structures to solve the aforementioned problems generated during handover of a registree. More specifically, an embodiment of the present invention proposes a function of setting up handover with a GW, a handover switching function using a handover context in a GW, stored during a previous handover setup procedure, and a handover rollback function, in a situation in which a device registered in a system moves to a different area after registration and hands over to a GW to continue services.

Figure 8:
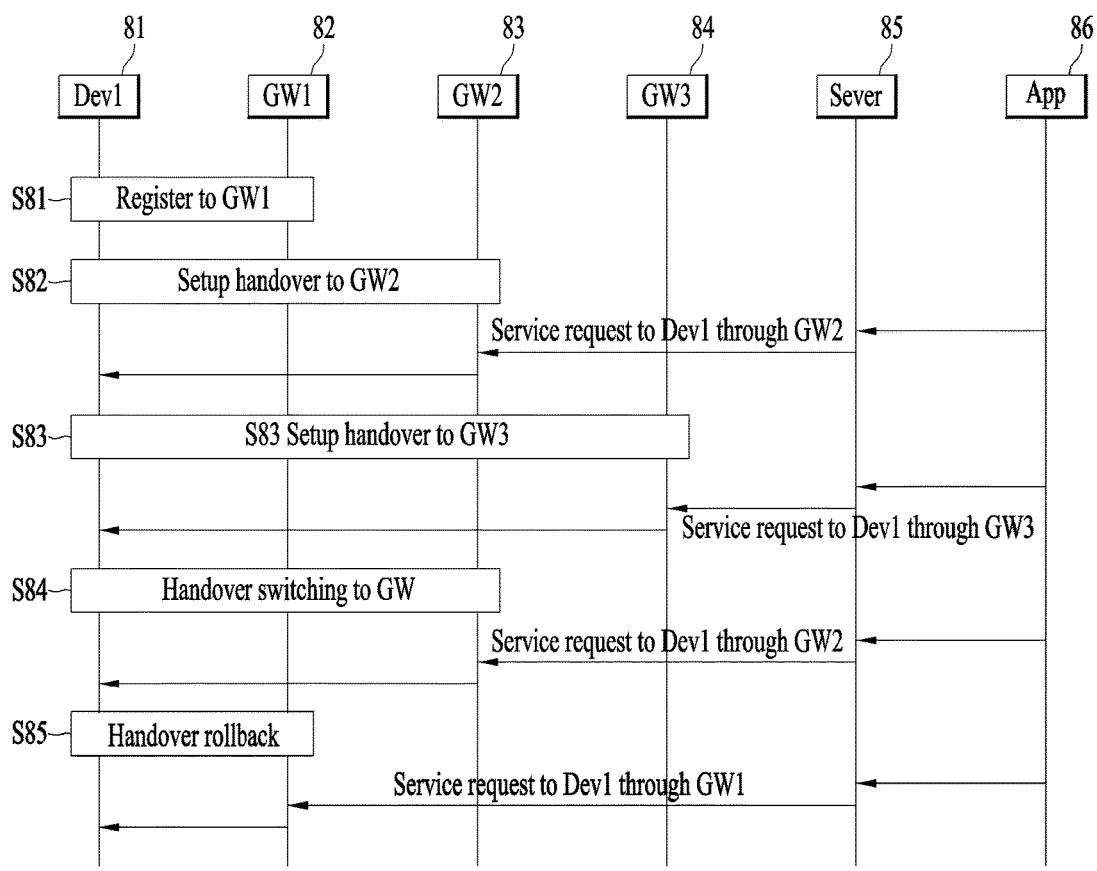
FIG. 8 illustrates handover setup, handover switching and handover rollback according to an embodiment of the present invention.

FIG. 8 illustrates handover related functions according to an embodiment of the present invention. The following description is based on the assumption that a device, a gateway (GW), a server and an application include at least one of the aforementioned oneM2M entities.

Device 1 81 registers to GW1 82 to finish system registration (S81). Here, registration context information (e.g., access address, ID, etc.) of device 1 can be stored in GW1. Then, device 1 can use oneM2M services through GW1.

Device 1 may physically move and hand over to GW2 83 (S82). Here, it is assumed that device 1 cannot communicate with GW1. During initial handover of device 1, handover information is stored in GW2. The handover information is stored in the form of a resource, and thus a lower resource of a specific resource of GW2 may be generated and the handover information may be represented as a value of the generated resource. For example, the handover information may include the ID of device 1 (specifically, entity (AE or CSE) ID corresponding to device 1), a registration information ID, a handover ID, etc. The handover ID may be a temporary ID of device 1, assigned by GW2. GW2 may store current handover state information of device 1 in registration information related to device 1, stored in GW1. For example, the handover state information may include the ID of GW2 (specifically, the ID of an entity (CSE) corresponding to GW1, handover ID and handover information (or a resource in which the handover information is stored)). Update of the registration information according to storage of the handover state information may be performed in such a manner that device 1 sends a request to GW2 and GW2 delivers the request to GW1.

Thereafter, a service request for device 1 can be delivered to device 1 through GW2.

Device 1 may move and hand over to GW3 (S83). During initial handover to GW3, handover information can be stored in GW3. GW3 can store current handover state information in the registration information stored in GW1. Then, a service request for device 1 may be delivered to device 1 through GW3.

Device 1 may hand over to GW2 (S84). Here, the previous handover information of device 1 has been stored in GW2. Accordingly, GW2 can process the handover request of device 1. For example, when GW2 receives a service request of device 1 for GW1 or another entity, GW2 can recognize the service request as a request for handover thereto and process the request. Here, GW2 can store current handover state information in the registration information related to device 1, stored in GW1, using the handover information. Then, the service request for device 1 is delivered to device 1 through GW2.

Device 1 may return to GW1 and finish handover with GW2. Here, device 1 may explicitly request handover rollback, or GW1 may recognize a service request of device 1 for GW1 or another entity as a handover rollback request and process the request (S85). GW1 may delete handover related information from among the registration information about device 1. Then, the service request for device 1 may be delivered to device 1 through GW1.

In the following description, initial handover to a GW may be referred to as handover setup, non-initial handover of returning to the GW may be referred to as handover switching, and retuning to a GW to which the corresponding device has been registered (i.e., registrar GW) may be referred to as handover rollback.

Handover setup, handover switching and handover rollback will be described in more detail with reference to the attached drawings.

Handover Setup

A GW can directly receive a request message from an originator (S910). Direct reception means that the GW receives the request message without passing through an entity such as another GW.

The GW can check whether the originator of the received request message is an entity registered therein, that is, a registree (S920). For example, the originator can be device 1 described above with reference to FIG. 8.

When the originator is not an entity registered to the GW, the GW can check whether the request message is for a handover setup request (S930). That is, the GW can check whether the originator requests handover to the GW.

When the request is for handover setup, the GW can store handover information included in the request message of the originator (S940). The handover information may include the originator ID (i.e., the ID of device 1 (specifically, the ID of an entity (AE or CSE) corresponding to device 1), registration information ID, handover ID, etc.). In addition, the GW may assign a handover ID that can be used by the originator during handover and store the handover ID. The handover information may be stored in the GW or an entity accessible by the GW.

The GW adds current handover state information to registration information related to the originator, stored in a registrar of the originator, to update the registration information (S950). For example, the handover state information can include the ID of GW2 (specifically, the ID of an entity (CSE) corresponding to the GW, handover ID, and handover information (or a resource in which the handover information is stored)). The registration information can be stored in the registrar (e.g., GW1 of FIG. 8) of the originator, in general.

The GW can announce a successful handover result to the originator (S960). In this case, information such as the handover ID additionally assigned/stored by the GW may be delivered.

Handover Switching

Handover switching refers to re-execution of handover to a GW in which handover information is stored. In this case, handover can be performed without an additional procedure because the handover information stored or remaining in the GW is used.

A GW can directly receive a request message from an originator (S910). Direct reception means that the GW receives the request message without passing through an entity such as another GW.

The GW can check whether the originator of the received request message is an entity registered thereto, that is, a registree (S920). For example, the originator can be device 1 described above with reference to FIG. 8.

When the originator is not an entity registered to the GW, the GW can check whether the request message is for a handover setup request (S930). That is, the GW can check whether the originator requests handover to the GW.

When the request is not for handover setup, the request can be interpreted as a request for handover switching to the GW. That is, since the request is directly received from the originator and the originator is not a registree of the GW, there is a high possibility that the originator previously performed handover setup with the GW. Accordingly, the GW can check whether the GW has past handover information of the originator (S931). Here, the past handover information may be handover information in which handover state information is inactive, which will be described below.

The GW can check whether the GW has the past handover information by comparing the originator ID included in the request message or a previously assigned handover ID with handover information stored in the GW.

If the GW has the past handover information of the originator, the request may be a specific request implicitly including a request for handover switching to the GW.

Accordingly, the GW can process handover of the originator, that is, handover switching, during processing of a different service request of the originator. In addition, when handover state information is inactive in the handover information of the originator, stored in the GW, the GW can switch from the inactive state to an active state.

When the GW does not have the past handover information of the originator, for example, if the GW does not have handover information of the originator or the GW has current (i.e., active) handover information of the originator, the request message is a specific request for the GW and thus the GW can process the request.

When the originator has the past handover information, the GW can add the current handover state information to registration information related to the originator, stored in the registrar of the originator, to update the registration information (S932). The handover information may include the GW ID, location of handover information, etc. In general, the registration information can be stored in the registrar of the originator.

The GW can process the request message from the originator (S933).

Handover Rollback

Handover release may be performed when the corresponding entity explicitly sends a request for handover information deletion to a-GW. Similarly to the handover setup procedure, handover release can be realized in such a manner that handover information is deleted from a GW to which the entity handed over and a target GW deletes handover information from among registration information related to the entity, stored in the relevant registrar.

A description will be given of a procedure through which the corresponding entity moves to the registrar and rolls back previous handover. Here, the handover information stored in the target GW is not deleted and re-handover to the target GW can be simply performed through the aforementioned handover switching procedure.

A GW can directly receive a request message from an originator (S910). Direct reception means that the GW receives the request message without passing through an entity such as another GW.

The GW can check whether the originator of the received request message is an entity registered thereto, that is, a registree (S920). For example, the originator can be device 1 described above with reference to FIG. 8.

When the originator is an entity registered to the GW, the GW can determine whether the originator is executing handover (S921). The GW can determine handover of the originator by checking whether the registration information related to the originator includes handover information related to the originator.

If the registration information does not include the handover information, the request message corresponds to a specific request for the GW (a request unrelated to handover) and thus the GW can process the request.

If the registration information includes the handover state information, the GW can recognize that the originator is executing handover. In addition, since the originator during handover directly transmits the request message to the GW, the GW can recognize the request message as handover rollback.

In this case, the GW can delete the handover state information of the originator or switch the handover state information to an inactive state (S922).

Then, the GW can process the request message of the originator (S923).

As described above, handover information of a specific originator is stored in a target GW. Therefore, according to the present invention, the target GW provides communication with entities of the system only to an entity during handover even when the entity is not a registree thereof to allow the entity to use services. Furthermore, the present invention can deliver service requests of other entities of a local area to an entity during handover without passing through a server.

In addition, even after termination of handover to the target GW, the target GW preserves corresponding information, that is, handover information. Accordingly, when the corresponding entity wants to hand over to the target GW later, handover, more specifically, handover switching can be triggered through an unspecific request message without generating additional handover information to complete handover.

Embodiments of the present invention and effects according thereto will be described with reference to FIGS. 10 to 13.

Figure 10:
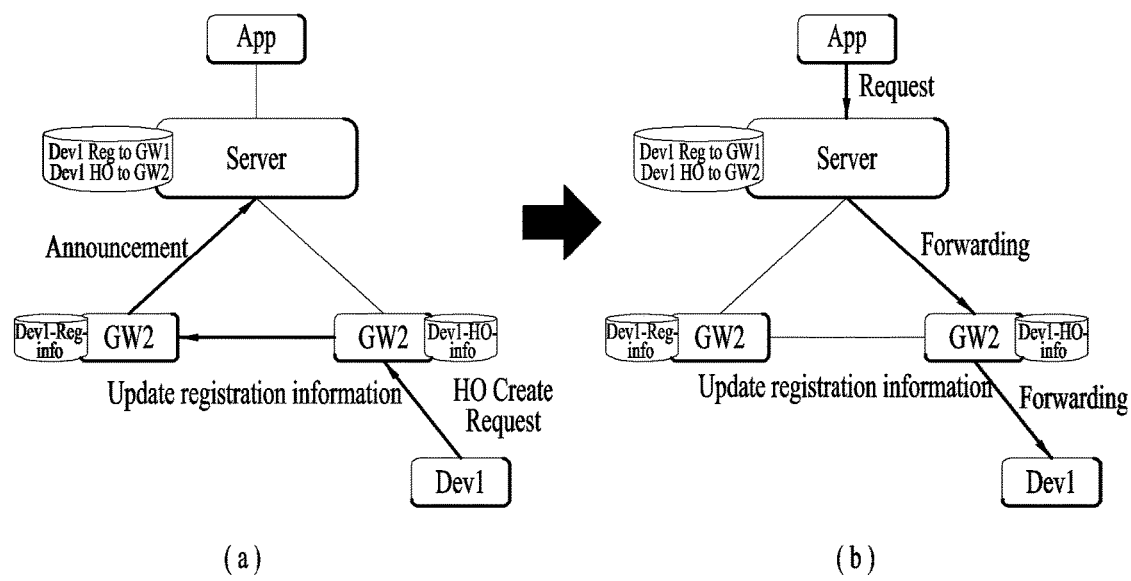
FIGS. 10, 11 and 12 illustrate handover setup, handover switching, handover rollback and request message processing therein according to an embodiment of the present invention.

FIG. 10 illustrates handover setup and a request message routing or forwarding procedure following handover setup according to an embodiment of the present invention.

FIG. 10(a) illustrates a handover (HO) setup operation of device 1. Device 1 can send a HO generation request to GW2. As in the aforementioned handover setup procedure, GW2 determines whether device 1 is a registree thereof, stores handover information Dev1-HO-Info because device 1 is not a registree and sends a request for adding or correcting the handover state information to registration information related to device 1, stored in GW1. Then, GW1 can announce that the registration information has been changed to a server.

FIG. 10(b) illustrates a procedure for routing or forwarding a request message from a specific application App after completion of handover setup. When the server receives the request message sent from the specific application to device 1, the server can recognize that device 1 has handed over to GW2 through the announced information and thus can deliver the request message to GW2. GW2 can deliver the request message to device 1. That is, even if device 1 hands over to the target GW (GW2), device 1 can receive a request message from the outside.

Figure 11:
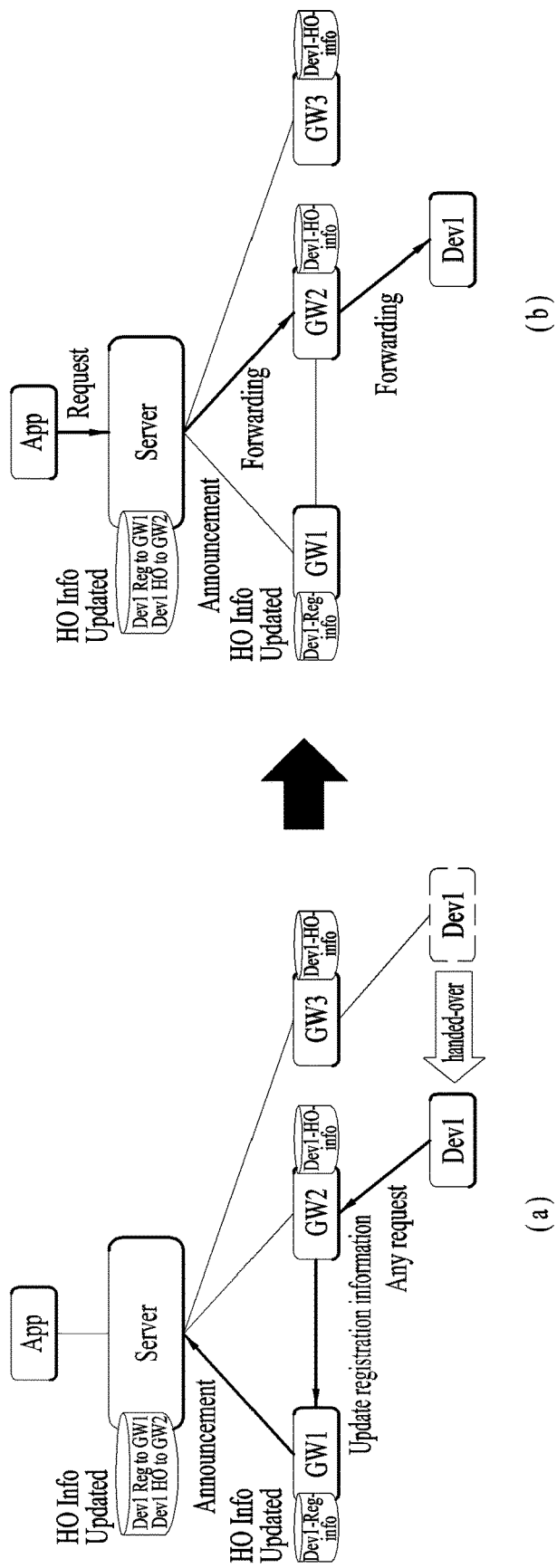

FIG. 11 illustrates a procedure for routing or forwarding a request message after handover switching according to an embodiment of the present invention.

Figure 9:
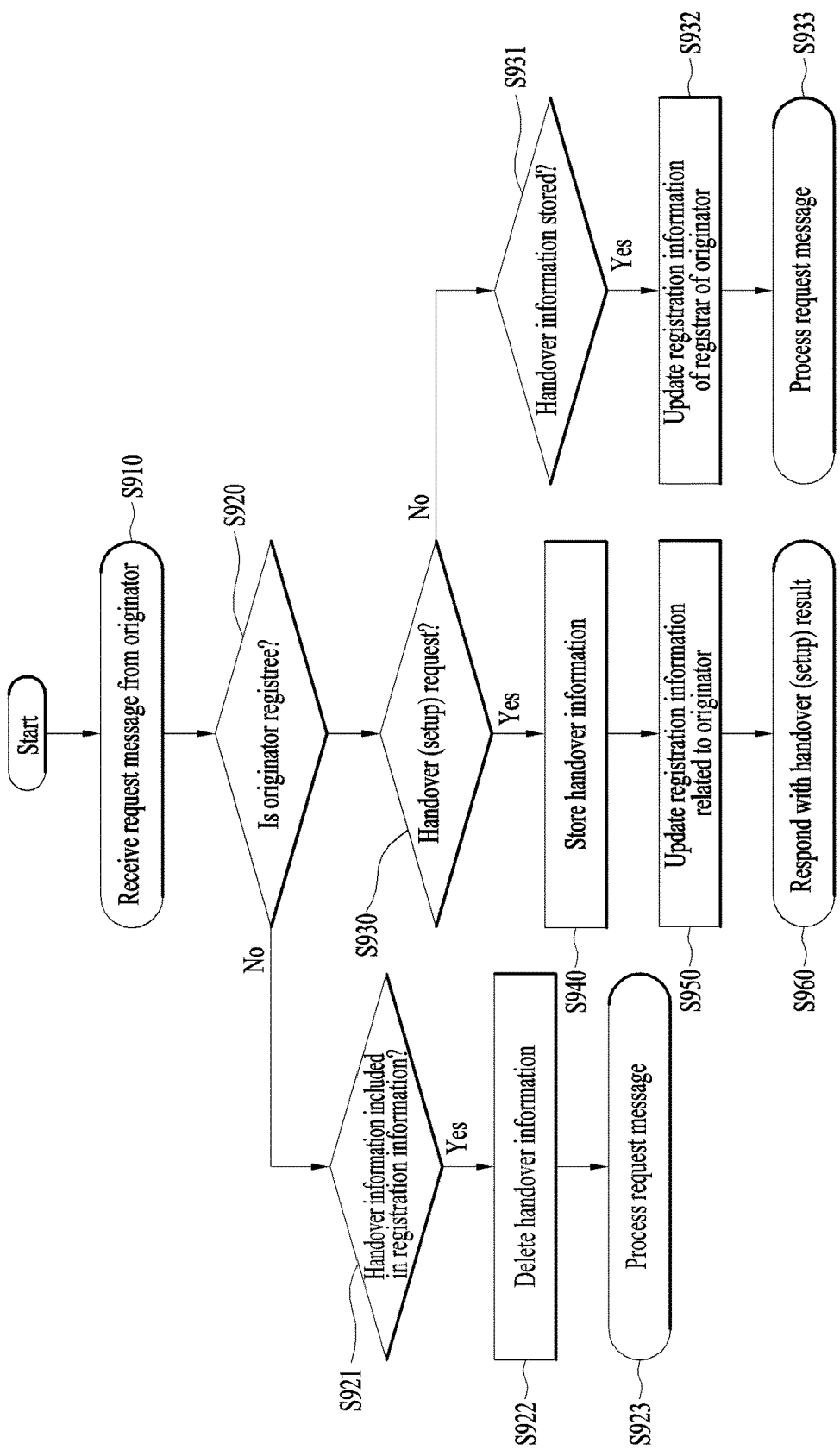
FIG. 9 illustrates handover setup, handover switching and handover rollback procedures according to an embodiment of the present invention.

FIG. 11(a) illustrates a handover switching operation of device 1. Device 1 hands over to GW2, hands over to GW3 and then hands over to GW2 again, as in FIG. 10(a). Here, handover of device 1 to GW2, that is, handover switching to GW2 can be confirmed by GW2 that receives a request message from device 1, as described above with reference to FIG. 9. In other words, GW2 directly receives the request message and performs the operation of S931 because device 1 is not a registree thereof. Since a previous target GW does not delete the handover information of device 1 even when device 1 hands over to other GWs, GW2 can recognize handover switching of device 1 thereto because GW2 has the handover information of device 1. Accordingly, GW2 can update or change the registration information (e.g., handover state information) related to device 1, stored in GW1, using current handover information and thus GW1 can announce the update or change to the server. It can be confirmed from the figure that GW3 corresponding to a previous target GW does not delete handover information.

FIG. 11(b) illustrates a procedure for routing or forwarding a request message from the specific application App after handover switching. Upon reception of the request message sent from the specific application to device 1, the server can recognize that device 1 has handed over to GW2 through the announced information and thus can deliver the request message to GW2. GW2 can deliver the request message to device 1. That is, even when device 1 performs handover switching to the target GW (GW2), device 1 can receive a request message from the outside.

As described above, when a device alternately performs handover to a plurality of GWs, the device can hand over to a target GW using previous handover information through a procedure for delivering an unspecific request message without re-executing handover setup if the target GW is a GW to which the device handed over in the past.

Figure 12:
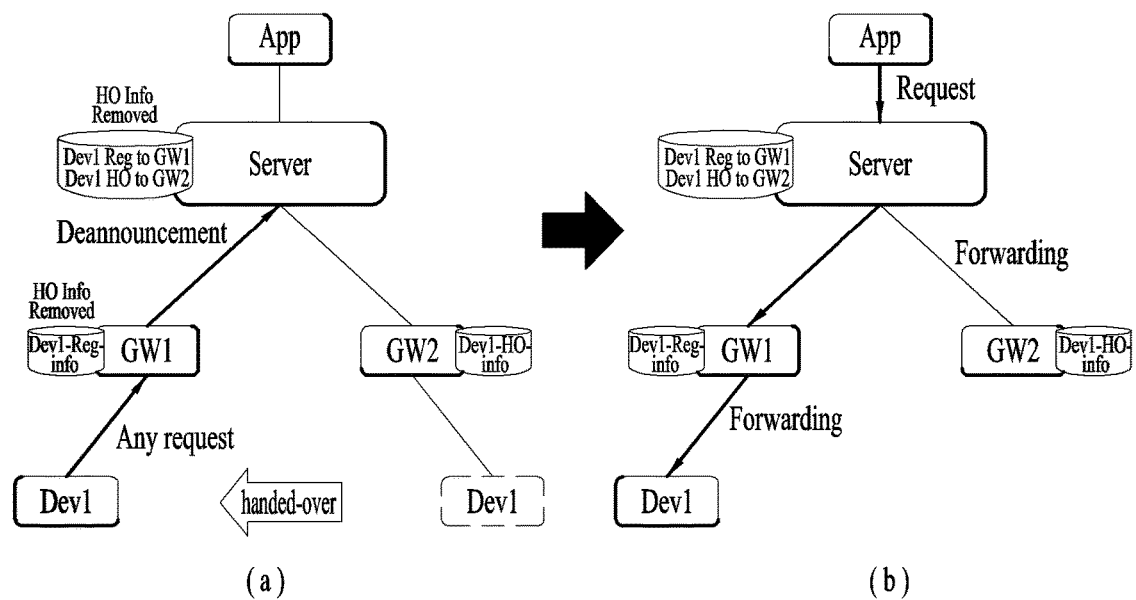

FIG. 12 illustrates a procedure for routing or forwarding a request message after handover rollback according to an embodiment of the present invention.

FIG. 12(a) illustrates a procedure through which device 1 hands over to GW1 corresponding to the registrar thereof, that is, a handover rollback procedure. Handover rollback of device 1 to GW1 can be confirmed by GW2 that receives a request message from device 1 as described above with reference to FIG. 9. In other words, GW1 directly receives the request message from device 1 and performs the operation of S921 since device 1 is a registree thereof. When device 1 hands over to another GW, GW1 can check whether registration information related to device 1, stored therein, includes handover state information of device 1 because handover state information is included in the registration information related to device 1, stored in GW1, as described above. Since the registration information includes the handover state information of device 1, GW1 can delete the handover state information from the registration information and deannounce deletion of the handover information to the server.

FIG. 12(b) illustrates a procedure for routing or forwarding a request message from the specific application App after handover rollback. Upon reception of the request message sent from the specific application to device 1, the server can recognize handover rollback of device 1 to GW1 through deannouncement and thus can deliver the request message to GW1. GW1 can deliver the request message to device 1. That is, even when device 1 performs handover rollback to the target GW (GW2), device 1 can receive a request message from the outside.

As described above, when a device intends to finish handover and use services through the original registrar, the device can finish handover by sending an unspecific request message to the registrar without an additional handover termination procedure and a procedure of deleting the handover information stored in the target GW. Then, the device can receive a service request message from the outside through the registrar. As in handover switching, handover information of the target GW remains and thus handover to the GW can be re-executed even after handover rollback without an additional handover setup procedure.

Figure 13:
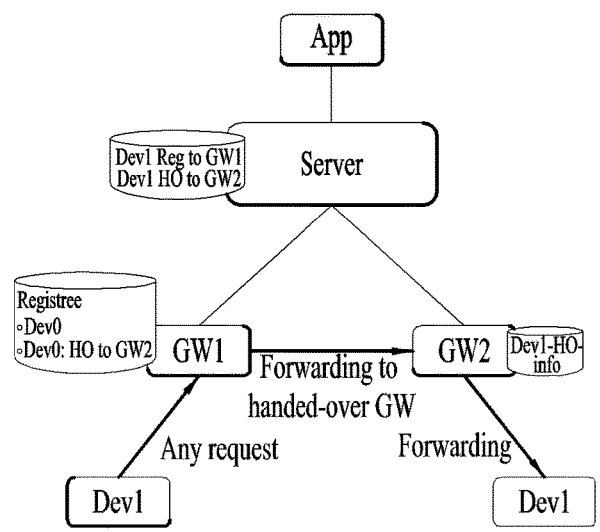
FIG. 13 illustrates request message processing related to handover in a local network according to an embodiment of the present invention.

FIG. 13 illustrates a procedure for routing or forwarding a request message according to an embodiment of the present invention.

After handover setup, handover switching and handover rollback procedures described above with reference to FIGS. 10 to 12, a request message can be transmitted and received between devices in a local network without passing through the server.

Figure 14:
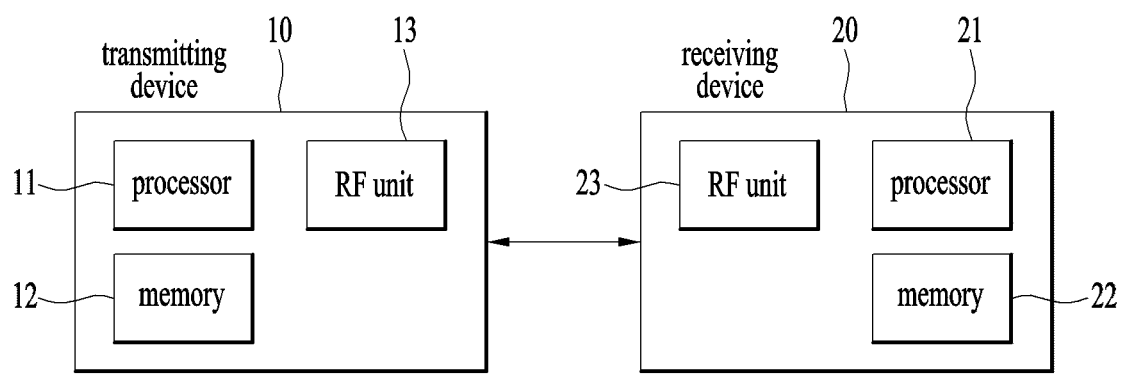
FIG. 14 is a block diagram of an apparatus for implementing embodiments of the present invention.

FIG. 14 is a block diagram of a transmitting device 10 and a receiving device 20 configured to implement exemplary embodiments of the present invention. Referring to FIG. 14, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers.

The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

In the embodiments of the present invention, application (entity) or resource related entity etc. may operate as devices in which they are installed or mounted, that is, a transmitting device 10 or a receiving device 20.

The specific features of the application (entity) or the resource related entity etc. such as the transmitting device or the receiving device may be implemented as a combination of one or more embodiments of the present invention described above in connection with the drawings.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The present invention may be used for a wireless communication apparatus such as a terminal, a base station, a server, or other apparatuses.

The invention claimed is:

1. A method for processing a request message in a wireless communication system, the method being performed by a first M2M (machine-to-machine) device and comprising:
   receiving the request message directly from an originator device;
   determining whether the originator device has been registered to the first M2M device;
   determining whether the request message is for handover setup when the originator device has not been registered to the first M2M device;
   when the request message is determined to be for handover setup:
      storing handover information included in the request message,
      updating registration information related to the originator device according to the handover information, and
      transmitting a processing result regarding the request message to the originator device; and
   when the request message is determined to be not for handover setup:
      determining whether the first M2M device has handover information related to the originator device,
      updating registration information related to the originator device when the first M2M device has the handover information related to the originator device, and
      processing the request message,
   wherein the updating the registration information related to the originator device comprises storing handover state information including an ID of the first M2M device, a handover ID and a handover information ID in the registration information.

2. The method according to claim 1, wherein the handover information includes an ID of the originator device, a registration information ID and a handover ID.

3. The method according to claim 1, wherein the updating of the registration information is announced to a server and used for message routing or forwarding.

4. The method according to claim 1, further comprising assigning a handover ID related to handover setup to the originator device.

5. The method according to claim 1, wherein the determining whether the first M2M device has handover information related to the originator device comprises comparing information about the originator device with the handover information stored in the first M2M device.

6. The method according to claim 1, further comprising:
   when the originator device has been registered in the first M2M device, determining whether handover state information related to the originator device is stored in the registration information related to the originator device;

deleting the handover state information when the handover state information is stored in the registration information related to the originator device; and processing the request message.

7. The method according to claim 1, wherein the handover information is stored as a specific value in a resource created under a specific resource of the first M2M device.

8. A first M2M (machine-to-machine) device configured to process a request message in a wireless communication system, the first M2M device comprising:

a transceiver; and a processor that controls the transceiver, wherein the processor:

receives the request message directly from an originator device, determines whether the originator device has been registered to the first M2M device, determines whether the request message is for handover setup when the originator device has not been registered to the first M2M device, when the request message is determined to be for handover setup:

stores handover information included in the request message, updates registration information related to the originator device according to the handover information, and transmits a processing result regarding the request message to the originator device, and when the request message is determined to be not for handover setup:

determines whether the first M2M device has handover information related to the originator device, updates registration information related to the originator device when the first M2M device has the handover information related to the originator device, and processes the request message, wherein the updating of the registration information includes storing handover state information including an ID of the first M2M device, a handover ID and a handover information ID in the registration information to update the registration information related to the originator device.

9. The first M2M device according to claim 8, wherein the handover information includes an ID of the originator device, a registration information ID and a handover ID.

10. The first M2M device according to claim 8, wherein the updating of the registration information is announced to a server and used for message routing or forwarding.

11. The first M2M device according to claim 8, wherein the processor assigns a handover ID related to handover setup to the originator device.

12. The first M2M device according to claim 8, wherein the processor compares information about the originator device with the handover information stored in the first M2M device to determine whether the first M2M device has handover information related to the originator device.

13. The first M2M device according to claim 8, wherein, when the originator device has been registered in the first M2M device, the processor determines whether handover state information related to the originator device is stored in the registration information related to the originator device, deletes the handover state information when the handover state information is stored in the registration information related to the originator device and processes the request message.

14. The first M2M device according to claim 8, wherein the handover information is stored as a specific value in a resource created under a specific resource of the first M2M device.

* * * * *